US012639746B2

(12) United States Patent
Isgar

(10) Patent No.: US 12,639,746 B2
(45) Date of Patent: *May 26, 2026

(54) MARKET SPACE MARKETPLACE SYSTEM WITH AI FUNCTION

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/928,879

(22) Filed: Oct. 28, 2024

(65) Prior Publication Data

US 2025/0054056 A1 Feb. 13, 2025

Related U.S. Application Data

(63) Continuation of application No. 17/728,035, filed on Apr. 25, 2022, now Pat. No. 12,131,372, which is a continuation-in-part of application No. 17/201,829, filed on Mar. 15, 2021, now abandoned, and a continuation-in-part of application No. 16/903,014, filed on Jun. 16, 2020, now Pat. No. 11,183,064.

(60) Provisional application No. 63/179,543, filed on Apr. 26, 2021, provisional application No. 62/870,454, filed on Jul. 3, 2019, provisional application No. 63/014,953, filed on Apr. 24, 2020.

(51) Int. Cl.
*G06Q 30/0645* (2023.01)
*G06Q 30/08* (2012.01)
*G06Q 50/16* (2024.01)

(52) U.S. Cl.
CPC ......... *G06Q 30/0645* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 7,685,023 | B1 | 3/2010 | Abraham et al. |
| 7,956,769 | B1 | 6/2011 | Pearl |
| 9,838,843 | B1 | 12/2017 | Bajaj et al. |

(Continued)

OTHER PUBLICATIONS

Whitla, Crowdsourcing and its Application in Marketing Activities, Contemporary Management Research, 5(1) pp. 15-28, 2009.

*Primary Examiner* — John F Mortell
(74) *Attorney, Agent, or Firm* — Schmeiser, Olsen & Watts LLP

(57) ABSTRACT

Described is a market space marketplace system for providing market spaces available through a marketplace system to lease as part of a marketplace transaction. The system also operates to provide marketplace valuation of various types of market spaces and product placement verification. The system may include a server having a memory storing market space information and a user computing device coupled to the server. The server may be programmed to receive and process a signal that the user computing device has accessed the system and is searching for a market space to lease at a system determined time period. The server may be programmed to send for display, on the user computing device, market space information including available market spaces to lease. Additionally, the server is programmed to automatically lease a selected market space in response to receiving user input requesting lease of the selected market space.

6 Claims, 12 Drawing Sheets

(56)　　　　　References Cited

U.S. PATENT DOCUMENTS

| | | | |
|---|---|---|---|
| 9,984,408 B1 | 5/2018 | Wong et al. | |
| 10,902,439 B2 | 1/2021 | Holman et al. | |
| 11,145,016 B1 * | 10/2021 | Brophy | G07C 9/00571 |
| 11,270,328 B1 | 3/2022 | Ossie | |
| 2001/0044751 A1 | 11/2001 | Pugliese, III et al. | |
| 2006/0259369 A1 | 11/2006 | Bongrazio et al. | |
| 2009/0287587 A1 | 11/2009 | Bloebaum et al. | |
| 2010/0241525 A1 | 9/2010 | Aguera et al. | |
| 2011/0246064 A1 | 10/2011 | Nicholson | |
| 2012/0233003 A1 | 9/2012 | Calman et al. | |
| 2013/0339255 A1 * | 12/2013 | Talbird | G06Q 30/02 |
| | | | 705/306 |
| 2014/0214595 A1 | 7/2014 | Argue et al. | |
| 2014/0279277 A1 | 9/2014 | Pei | |
| 2015/0317586 A1 * | 11/2015 | Kassman | G06Q 40/03 |
| | | | 705/7.23 |
| 2015/0339625 A1 | 11/2015 | Agasti et al. | |
| 2015/0369618 A1 | 12/2015 | Barnard et al. | |
| 2016/0150215 A1 | 5/2016 | Chen | |
| 2016/0260145 A1 | 9/2016 | High et al. | |
| 2016/0357768 A1 | 12/2016 | Strong et al. | |
| 2017/0236177 A1 | 8/2017 | Sebastian et al. | |
| 2017/0351975 A1 | 12/2017 | Webb | |
| 2018/0057262 A1 * | 3/2018 | Mitsuyu | H04N 7/188 |
| 2018/0374075 A1 | 12/2018 | Tian | |
| 2019/0114583 A1 | 4/2019 | Ripert et al. | |
| 2019/0149725 A1 | 5/2019 | Adato et al. | |
| 2019/0347704 A1 | 11/2019 | Stamboni et al. | |
| 2019/0392506 A1 | 12/2019 | Bogolea et al. | |
| 2020/0182634 A1 | 6/2020 | Karceski | |
| 2020/0302510 A1 | 9/2020 | Chachek et al. | |
| 2020/0410623 A1 | 12/2020 | Vahabzadeh | |
| 2021/0097484 A1 | 4/2021 | Ramos et al. | |
| 2021/0201263 A1 | 7/2021 | Glaser et al. | |

* cited by examiner

Market Space Marketplace

FOR RENT

Convenience Store
End Cap Statistics # of Stores: 10
Geo-location: Within 10 mi
of Golf Course
End Cap Location: By
Check Out
Nearby Event: Golf Tourn.
Time Period: 2 weeks
Starting Bid: $XX.XX
Auction Closes: 10 hrs Enter Auction Back

12

Figure 8:
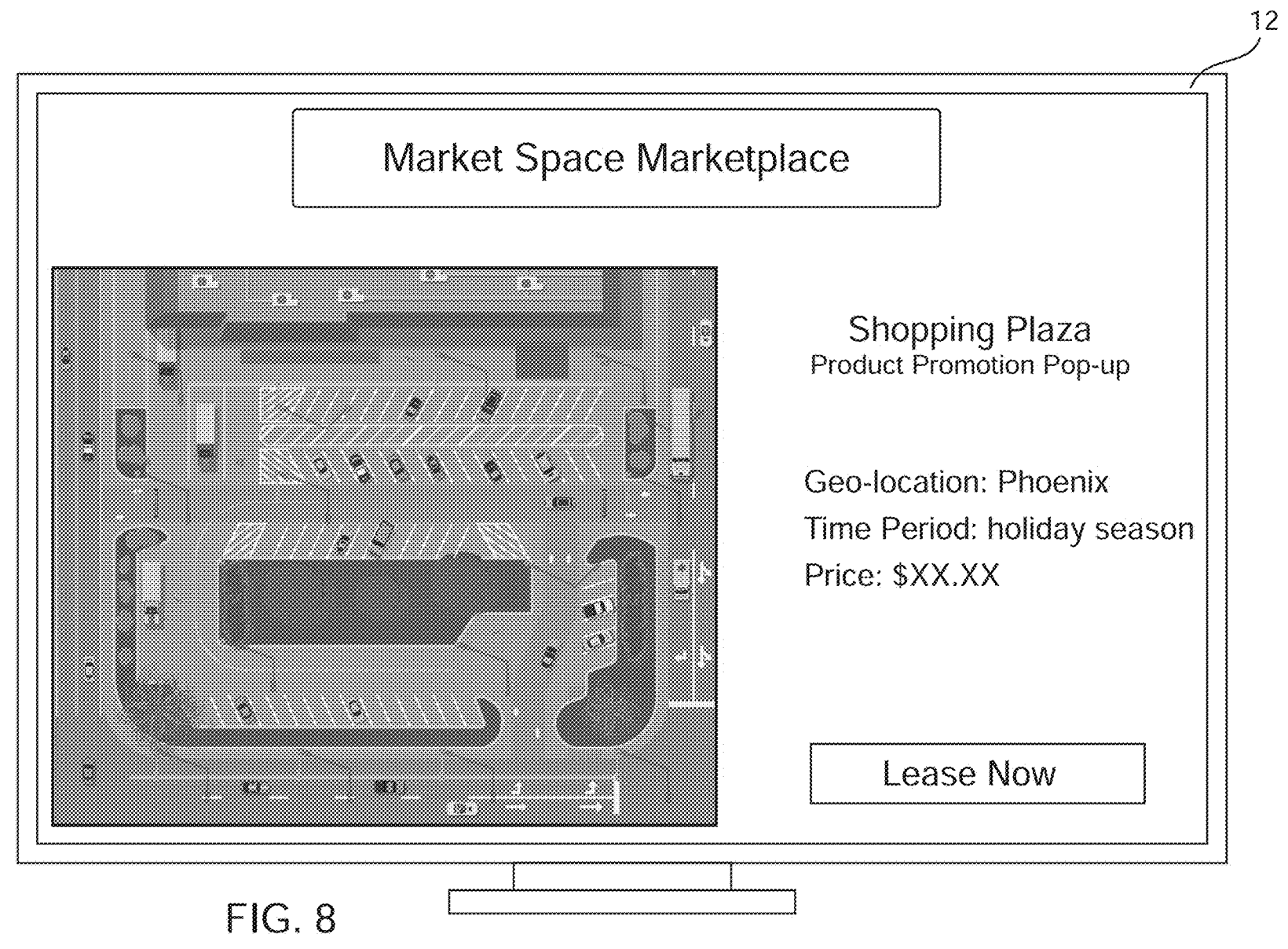

12

Market Space Marketplace

Shopping Plaza
Product Promotion Pop-up

Geo-location: Phoenix
Time Period: holiday season
Price: $XX.XX

Lease Now

Market Space Marketplace

Shopping Plaza
Product Promotion Pop-up

Visual Verification:
11:23 am
2:36 pm
5:23 pm

FIG. 9

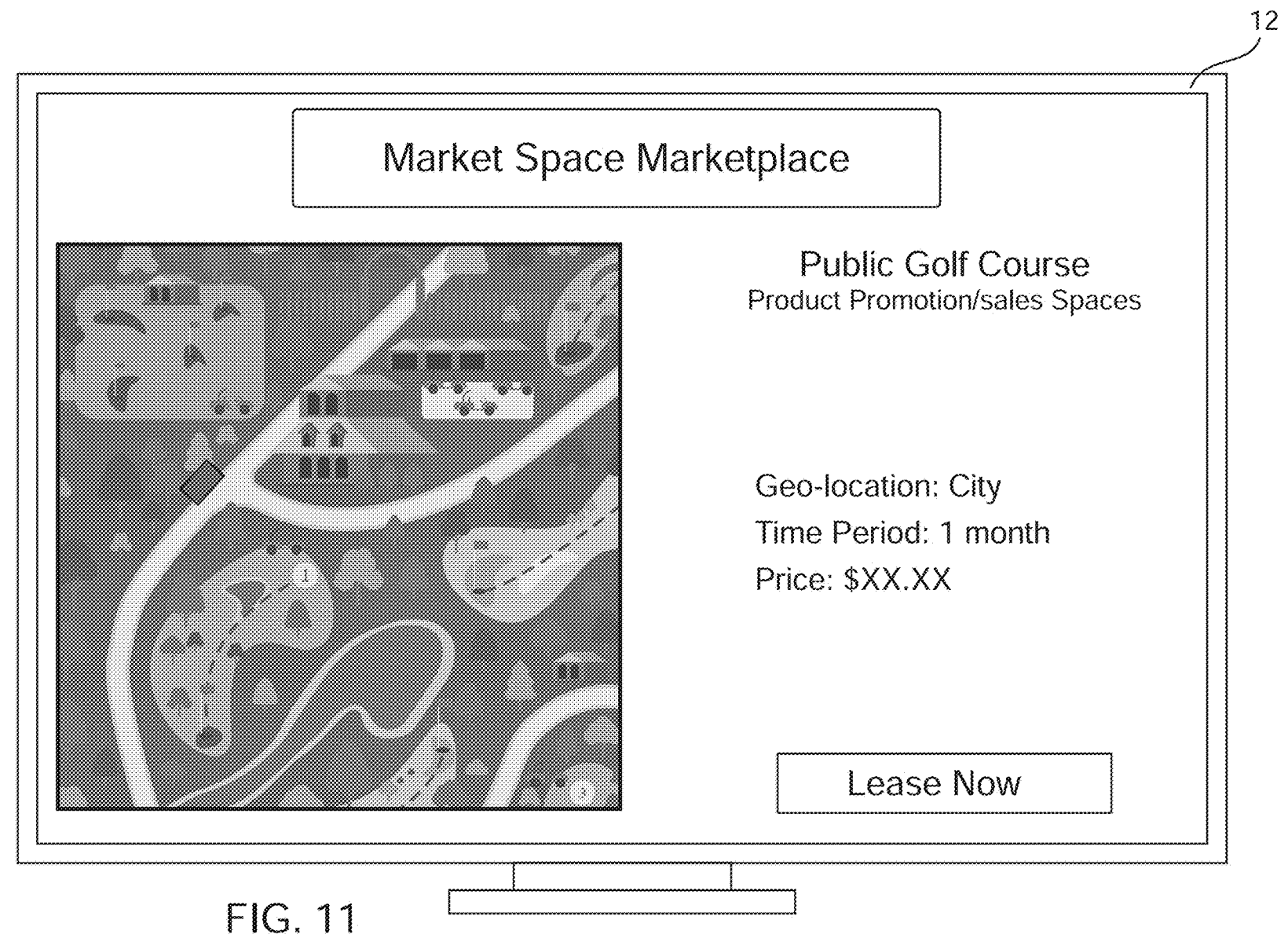

Market Space Marketplace

Public Golf Course
Product Promotion/sales Spaces

Geo-location: City
Time Period: 1 month
Price: $XX.XX

Lease Now

FIG. 11

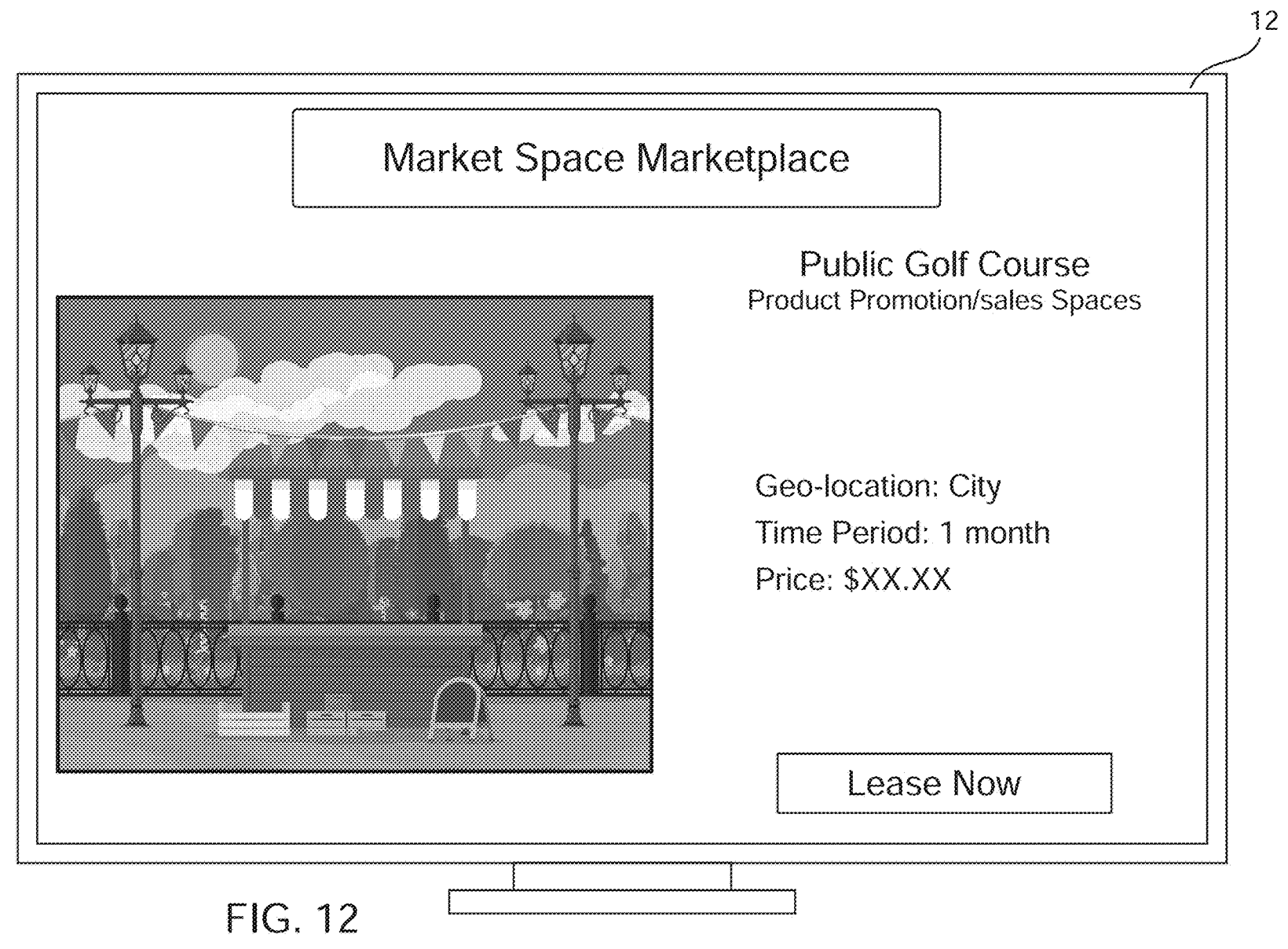

Market Space Marketplace

Public Golf Course
Product Promotion/sales Spaces

Geo-location: City
Time Period: 1 month
Price: $XX.XX

Lease Now

FIG. 12

MARKET SPACE MARKETPLACE SYSTEM WITH AI FUNCTION

CROSS REFERENCE TO RELATED APPLICATION[S]

This application is a continuation of U.S. patent application Ser. No. 17/728,035, filed Apr. 25, 2022, which claims priority of U.S. Provisional Patent Application Ser. No. 63/179,543, filed Apr. 26, 2021, and is a continuation-in-part of U.S. patent application Ser. No. 16/903,014, filed Jun. 16, 2020, now U.S. Pat. No. 11,183,064, issued Nov. 23, 2021, which claims priority to U.S. Provisional Patent Application Ser. No. 62/870,454, filed Jul. 3, 2019. Additionally, U.S. patent application Ser. No. 17/728,035 is a continuation-in-part of U.S. patent application Ser. No. 17/201,829, filed Mar. 15, 2021, which claims priority to U.S. Provisional Patent Application Ser. No. 63/014,953, filed Apr. 24, 2020, the disclosures of which are hereby incorporated entirely herein by reference.

BACKGROUND OF THE INVENTION

Technical Field

This invention generally relates to a marketplace system, and more specifically to a market space marketplace system for providing market spaces available through a marketplace system to lease as part of a marketplace transaction. The system also operates to provide marketplace valuation of various types of market spaces and product placement verification.

State of the Art

Online shopping is becoming more commonplace for all types of products, including groceries and other personal care and cleaning items, particularly, when a consumer does not or is not able to actually go to his or her favorite store. While online shopping is much more commonplace with various marketplaces that allow customers to shop in various ways for the goods they are seeking, there is not a system that exists that allows companies to purchase spaces to promote products, engage in advertising campaigns, lease advertising space, lease cooperative advertising spaces and for use with advertising platform and so forth.

Accordingly, what is needed is a market space marketplace system for providing market spaces available through a marketplace system to lease for product promotion and the like. The system also operates to provide marketplace valuation of various types of market spaces and product placement verification.

SUMMARY OF THE INVENTION

An embodiment includes a market space marketplace system comprising: a server having a memory storing area information; and a user computing device coupled to the server, wherein the server is programmed to: receive and process a signal that the user computing device has accessed the system and is searching for a market space to lease at a system determined time period; send for display, on the user computing device, market space information including available market spaces to lease; and automatically lease a selected market space in response to receiving user input requesting lease of the selected market space.

A market space marketplace system comprising: a server having a memory storing area information; and a plurality of user computing devices coupled to the server, wherein the server is programmed to: receive and process a signal that each of the user computing devices has accessed the system and is searching for a market space to lease at a system determined time period; send for display, on each of the user computing devices, market space information including available market spaces to lease; conduct an auction for a selected market space from the available market spaces, wherein the selected market space is selected by all of the plurality of user computing devices; receive bids from one or more of the plurality of user computing devices for a predetermined period of time; determine the highest bid from the plurality of user computing devices at the end of the predetermined period of time; and automatically lease the selected market space in response to the user computing device making the highest bid.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 8 is a view of a user interface operating on a user computing device for interaction with a market space marketplace system according to an embodiment;

FIG. 9 is a view of a user interface operating on a user computing device for interaction with a market space marketplace system according to an embodiment;

FIG. 11 is a view of a user interface operating on a user computing device for interaction with a market space marketplace system according to an embodiment; and FIG. 12 is a view of a user interface operating on a user computing device for interaction with a market space marketplace system according to an embodiment.

DETAILED DESCRIPTION OF EMBODIMENTS
OF THE INVENTION

Embodiments of the present invention relate to a market space marketplace system for providing market spaces available through a marketplace system to lease for product promotion and the like. The system also operates to provide marketplace valuation of various types of market spaces and product placement verification. It will be understood that embodiments of the system may be utilized in various ways such as with an advertising campaign, an advertising platform, cooperative advertising, and the like. Modern technology utilized by the system operates as a shopping system. The system may include the use of a mobile application operating on a user computing device and on a shopper computing device that may be a mobile computing device like a smartphone, a tablet, a wearable, and the like; and/or the system may operate on any type of computing device, including a computer or the like.

Figure 1:
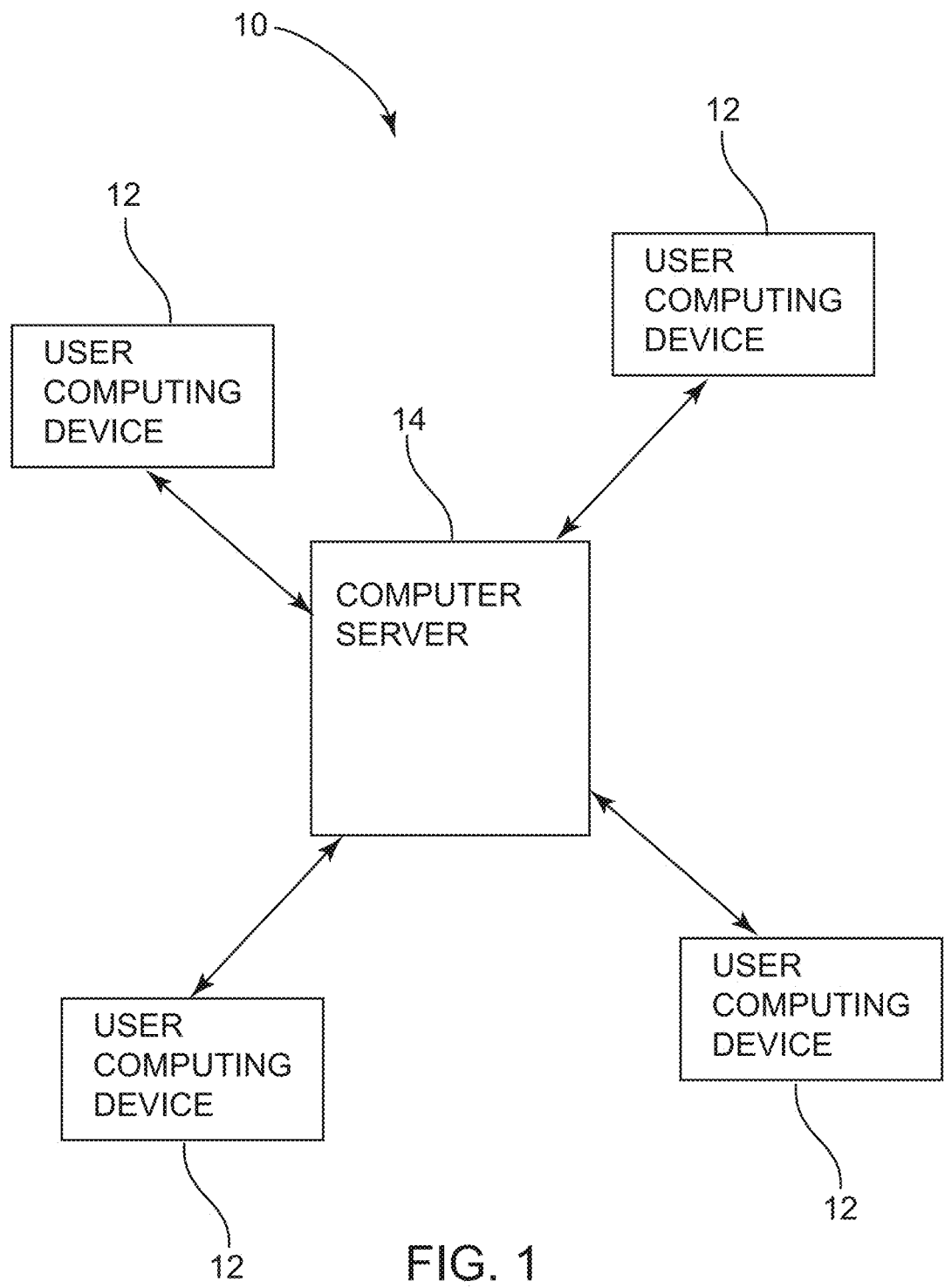
FIG. 1 is a diagrammatic view of a market space marketplace system according to an embodiment.

FIG. 1 depicts an embodiment of a shopping system 10. The system 10 may include user computing devices 12 and a computer server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may each be any of a desktop computer, a laptop, a tablet, a smartphone, a wearable device and the like. The server 14, in some embodiments, may be a computer server or a cloud-based infrastructure architecture.

The server 14 may include a memory storing market space information. The market space information may include information for a plurality of market spaces available for lease, wherein the information for each available market space may include, without limitation, location of market spaces available, groups of market spaces available, time periods of availability, historical data for market spaces that have been leased through the system, lease amount, image and/or video of the market space, maps showing locations of the market spaces and the like.

A user computing device 12 may be coupled to the server 14, and the server 14 may be programmed to receive a signal that a user computing device 12 has accessed the system 10 such as by operating an app or a web app on the user computing device 12. The server 14 may then be programmed to receive and process a signal that the user computing device 12 has accessed the system 10 and is searching for a market space to lease at a system determined time period; send for display, on the user computing device 12, market space information including available market spaces to lease; and automatically lease a selected market space in response to receiving user input requesting lease of the selected market space.

Figure 2:
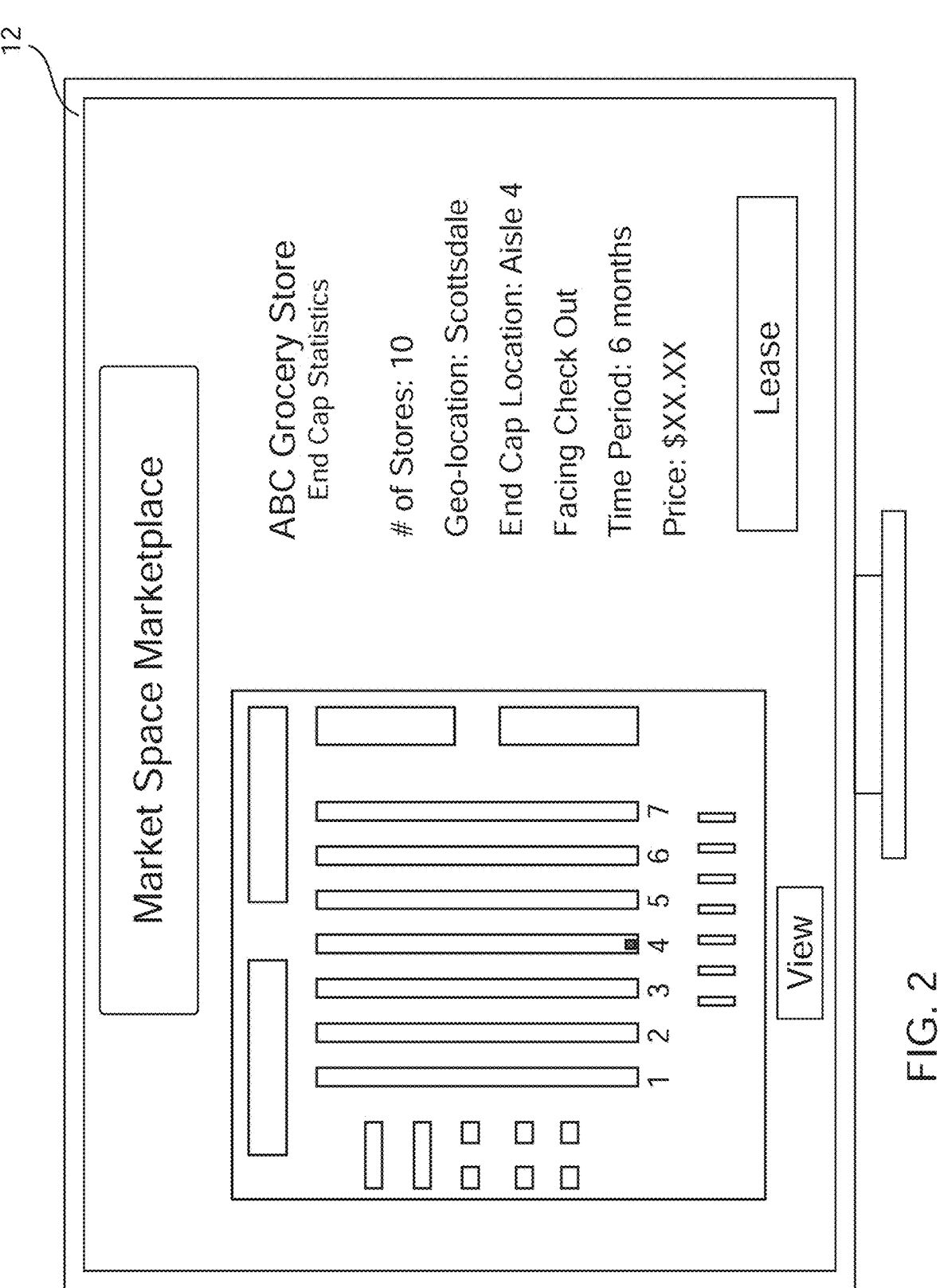
FIG. 2 is a view of a user interface operating on a user computing device for interaction with a market space marketplace system according to an embodiment.
Figure 3:
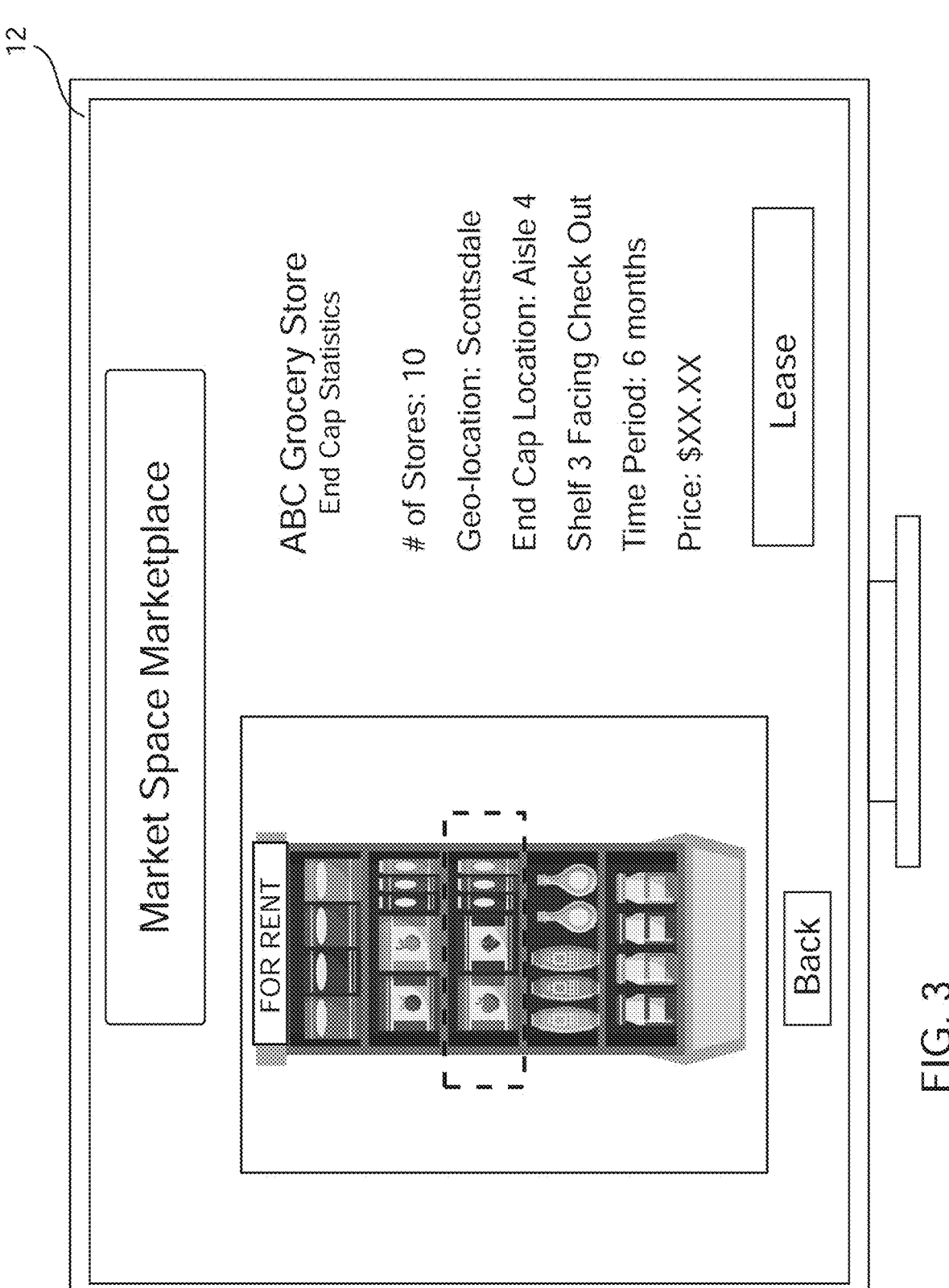
FIG. 3 is a view of a user interface operating on a user computing device for interaction with a market space marketplace system according to an embodiment.

Referring further to the drawings, FIGS. 2-12 depict embodiments of the market space marketplace system 10 in operation. As shown in FIGS. 2-3, the user computing device 12 may provide a user interface for searching for available market spaces available for lease through the marketplace system 10. In this embodiment, the user computing device 12 may select a particular available market space that is then displayed on the user computing device as shown in FIG. 2. In this embodiment, the market space available may be an endcap space at various locations of a grocery store, such as ABC Grocery Store. The server 14 may be programmed to provide market space information, such as, but not limited to, the number of market spaces available as part of a group of market spaces, the geo-location of the market spaces, the location within each of the stores, a time period for leasing the market space and a lease price. In embodiments, the user may select to view the market space, such as an endcap, that the user is desiring to lease, wherein an image and/or video of the endcap is sent by the server 14 for display on the user computing device 12, as shown in FIG. 3. In some embodiments, certain shelves of an end cap may be available for lease as opposed to the entire endcap, as indicated by the dashed square depicted in FIG. 3.

Figure 4:
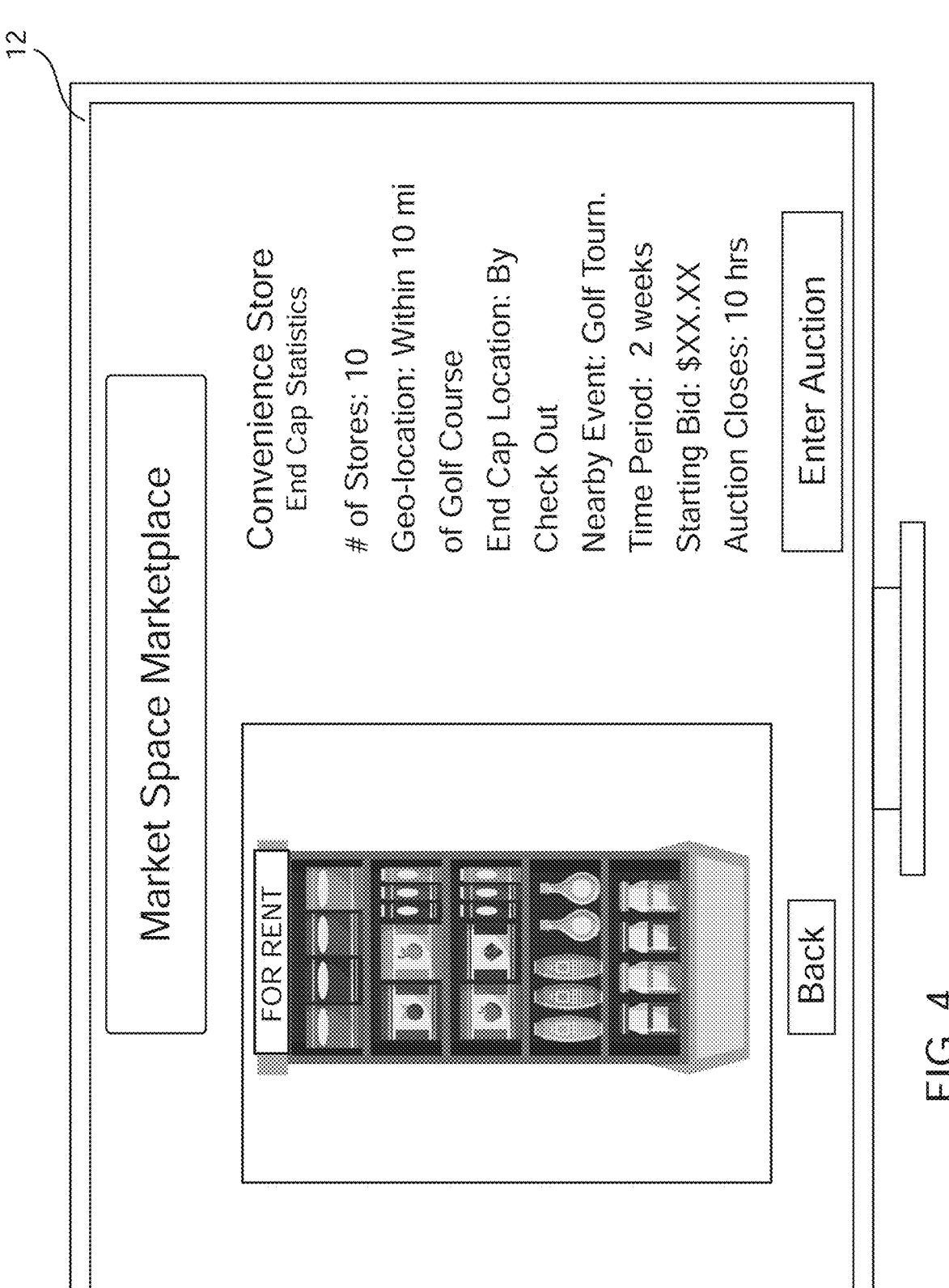
FIG. 4 is a view of a user interface operating on a user computing device for interaction with a market space marketplace system according to an embodiment.
Figure 5:
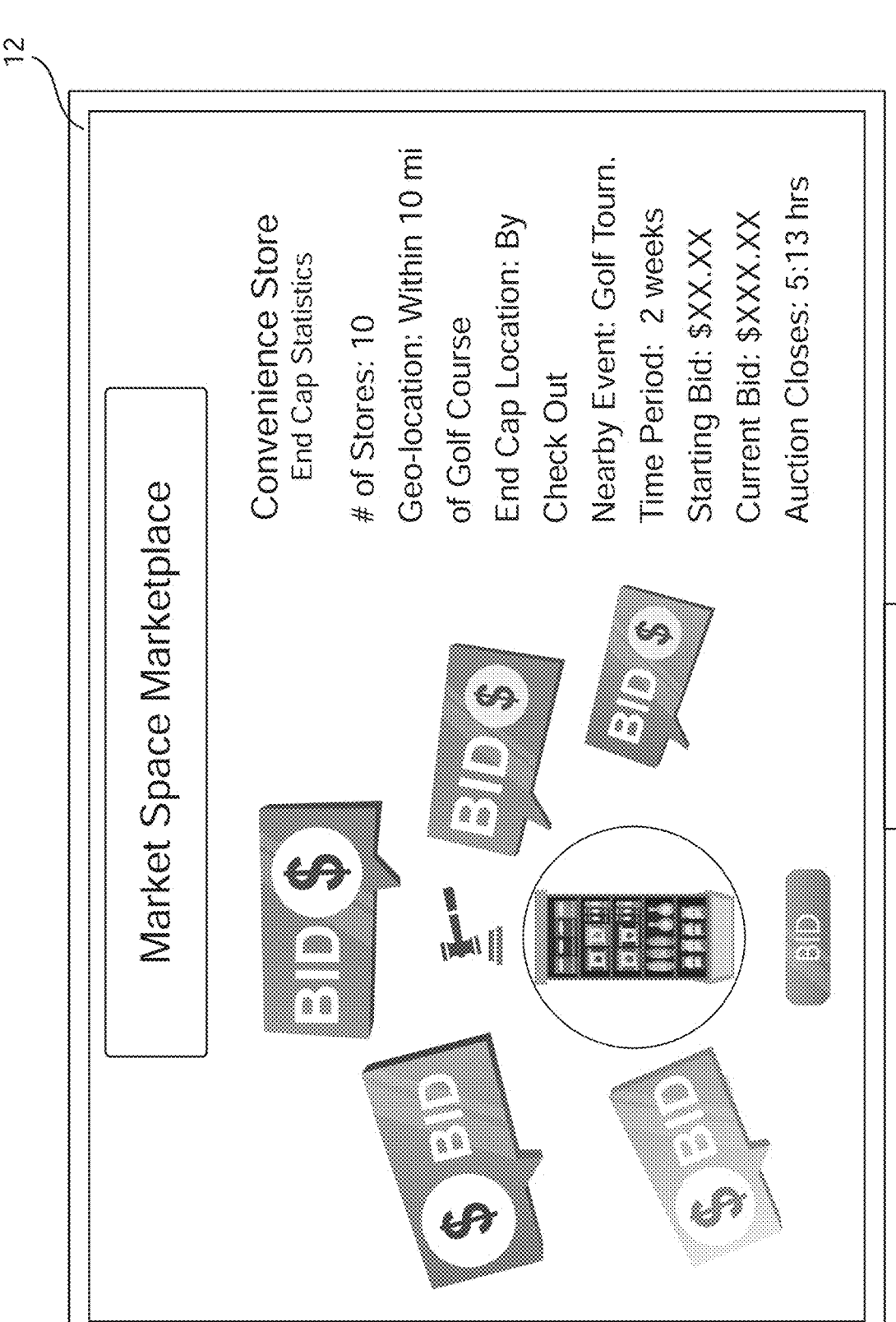
FIG. 5 is a view of a user interface operating on a user computing device for interaction with a market space marketplace system according to an embodiment.

In some embodiments of the system 10, the server 14 may be programmed to present on the user computing device an auction option, as depicted in FIGS. 4-5. These figures depict the endcap with information similar to that as shown in FIGS. 2-3, but at a convenience store chain and with an auction option. Additionally, the time period may be for a particular event, such as a golf tournament as shown, other sporting event, concert, festival, rally, convention or the like. Further, the user computing device 12 may include a user interface that also displays a starting bid amount and the time for when the auction ends, as shown in FIG. 4. The user may select to enter the auction and be directed to the user interface shown in FIG. 5, wherein the user may select to bid, and the information for the end cap additionally includes the current bid and a countdown time remaining in the auction. The user with the highest bid wins the auction and the ability to use the market space for product promotion.

In the embodiments depicted in FIGS. 2-5, the market space is shown as an end cap. End caps are unique display fixtures with two basic purposes. One, they display items, drawing customers into the store or to a specific aisle. The items displayed could be on promotion, or you might want to highlight a particular product. The choice is up to you. Second, an end cap display aims to sell more products. Visually, an end cap display captures attention, and functionally it can help you to convert browsers into buyers.

Figure 6:
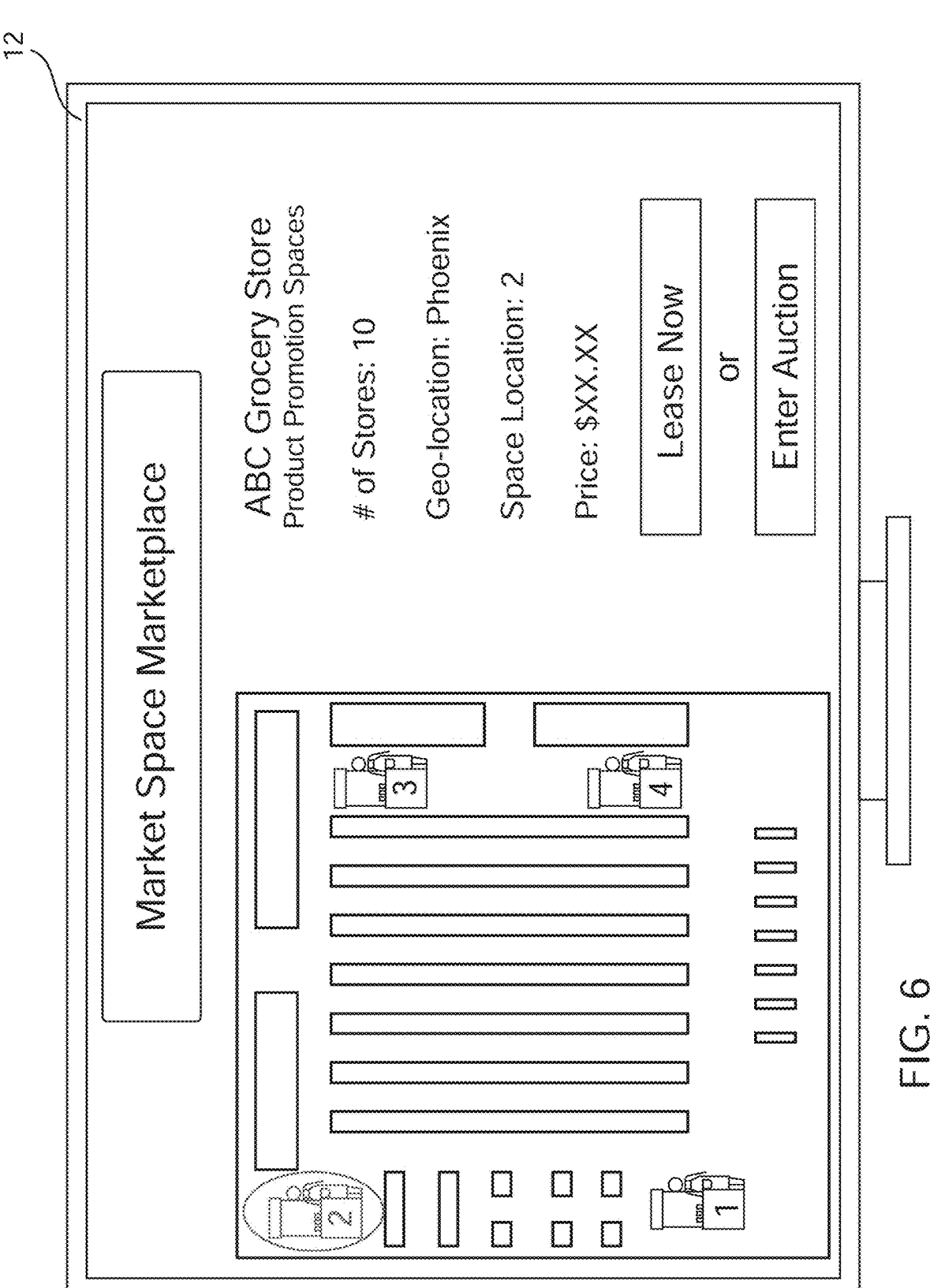
FIG. 6 is a view of a user interface operating on a user computing device for interaction with a market space marketplace system according to an embodiment.
Figure 7:
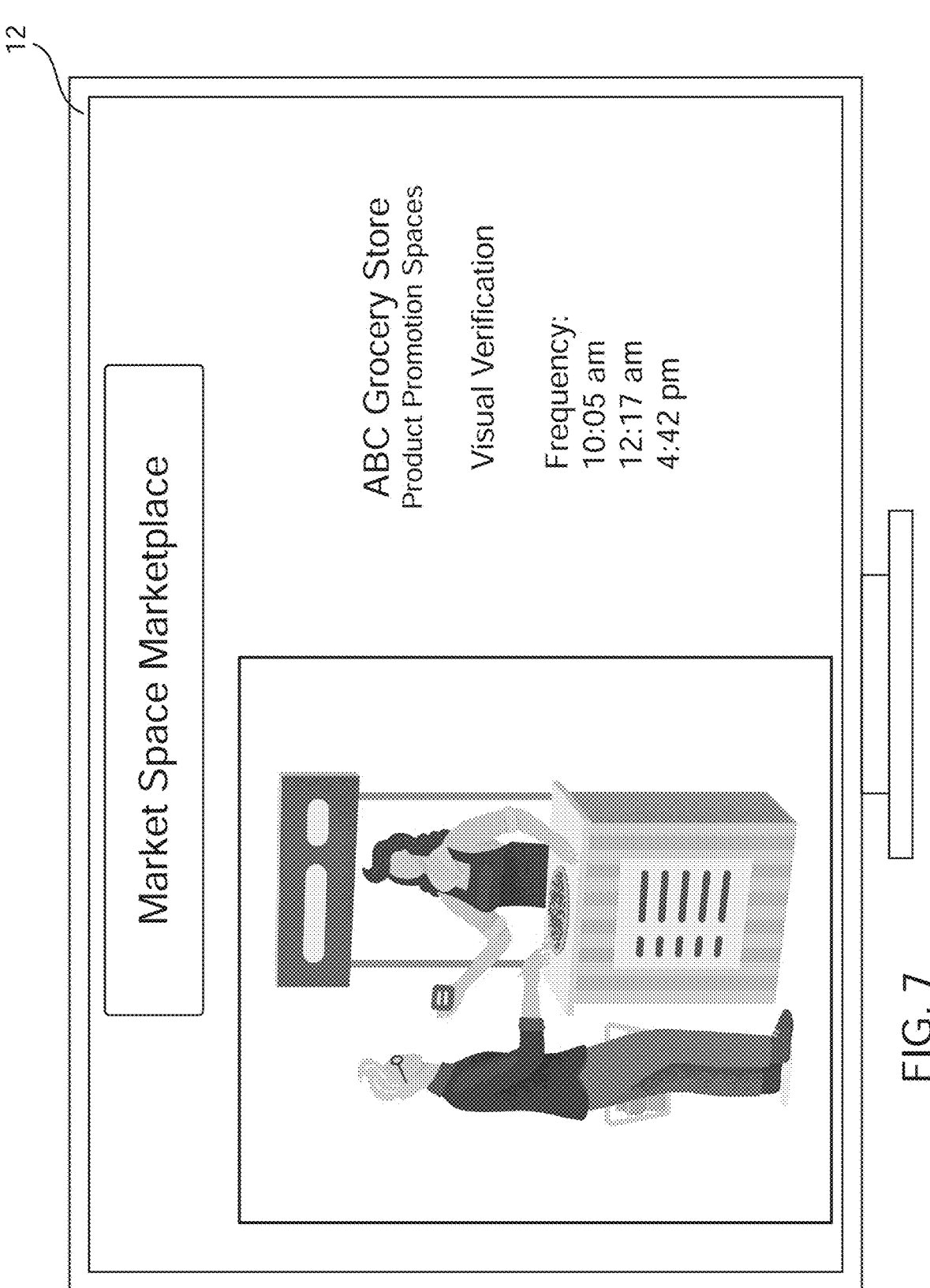
FIG. 7 is a view of a user interface operating on a user computing device for interaction with a market space marketplace system according to an embodiment.

Another market space that the system 10 may be utilized are product promotion booths that are established within stores. These product promotion booths may be product testing booths, demonstration booths and the like. FIG. 6 depicts the server 14 programmed to send for display on the user computing device 12 a market space for lease that is a product promotion booth. The user interface may include a map of the store with the product promotion booth highlighted and additional information such as the number of stores the booth is available, the geo-location, the space location within the store, the price for leasing and the time period for leasing the product promotion space. The user may purchase the lease right away for a price or may enter an auction for the space. The auction operates in a similar fashion as discussed with respect to FIG. 4-5. The system 10 may also operate to visually verify the operation of the product promotion space. For example, the utilization of gig economy workers as explained in the product placement services described in the priority applications incorporated by references, images and/or video of the product promotion space leased by the user may be sent to the user computing device 12 by the server 14 to provide visual verification of the operation of the product promotion booth, as seen in FIG. 7. The visual verification may also include the frequency of which verification has been accomplished by recording the time the image and/or video was sent to the server 14 from the gig economy workers.

Figure 9:
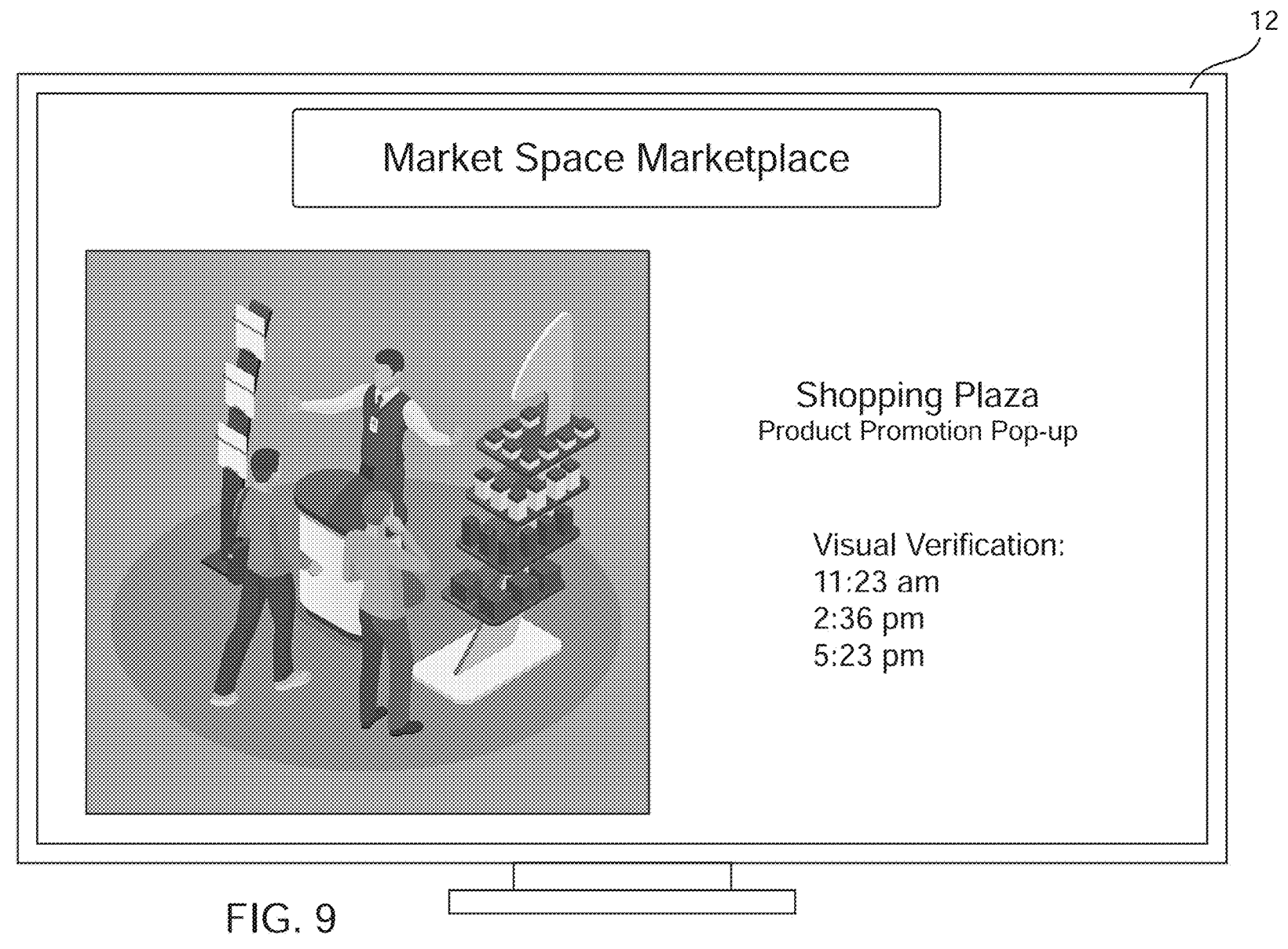

Market spaces similar to the product promotion booths within stores include product promotion pop-ups that are often located outside of retail spaces, such as, but not limited to outdoor malls/shopping centers, department stores, grocery stores, gyms/health centers and the like. FIG. 8 depicts a user computing device 12 with a user interface including a product promotion pop-up space for lease as sent from the server 14. This can include a visual location for the pop-up and the actual name of the business, where the pop-up is located, with a geo-location, time period and price for leasing. The system 10 may also operate to visually verify the operation of the product promotion pop-up. For example, the utilization of gig economy workers as explained in the product placement services described in the priority applications incorporated by references, images and/or video of the product promotion pop-up leased by the user may be sent to the user computing device 12 by the server 14 to provide visual verification of the operation of the product promotion pop-up, as seen in FIG. 9. The visual verification may also include the frequency of which verification has been accomplished by recording the time the image and/or video was sent to the server 14 from the gig economy workers.

Figure 10:
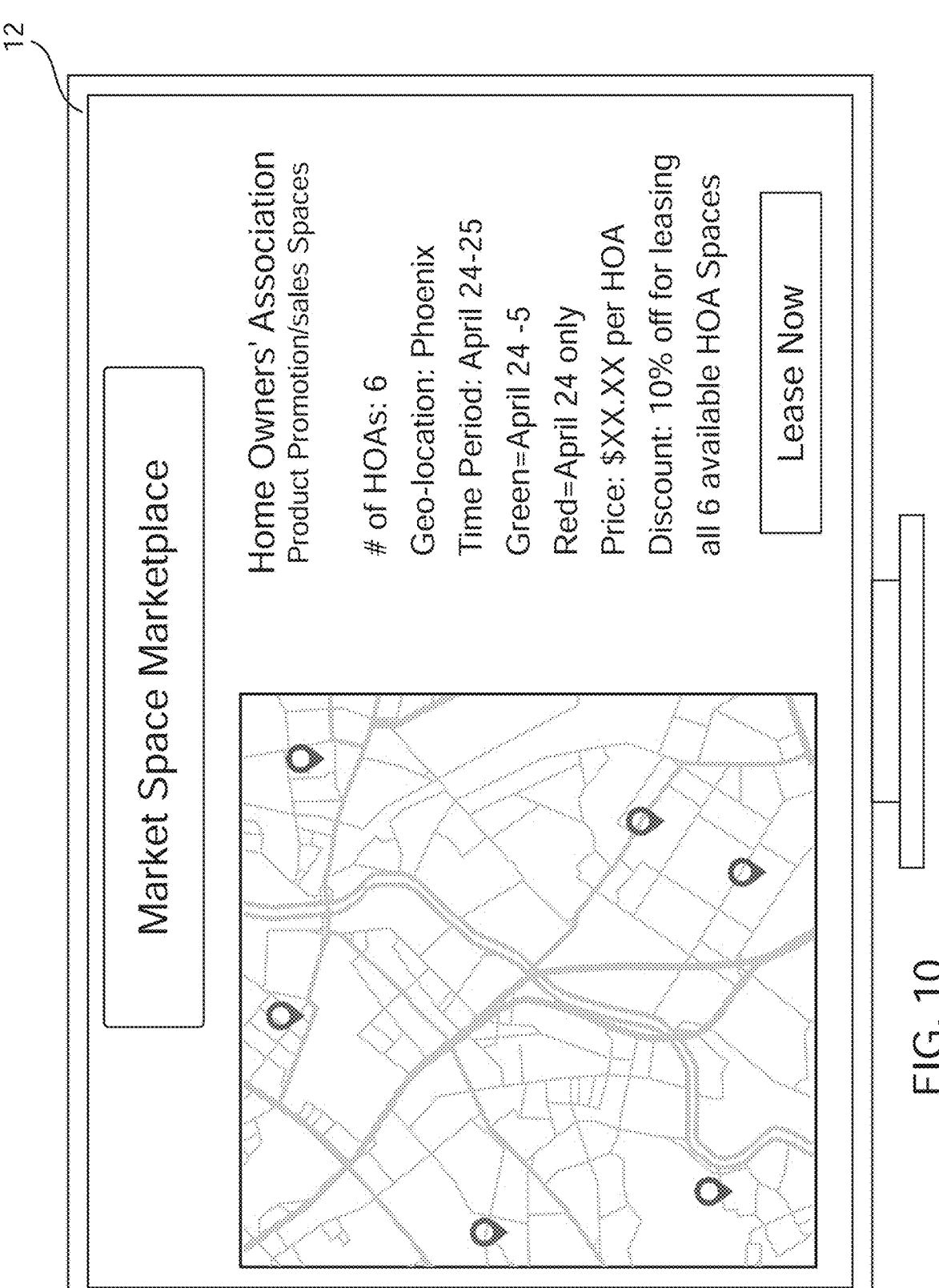
FIG. 10 is a view of a user interface operating on a user computing device for interaction with a market space marketplace system according to an embodiment.

These types of pop-ups may not be limited to retail businesses. In embodiments as depicted in FIG. 10, the system 10 may include the server 14 programmed to send for display on the user computing device 12, a user interface with various homeowners' associations that are leasing pop-up spaces within their respective communities. The user interface may depict a map with locations of the homeowners' associations with available spaces for lease. The market space information may include the number of HOAs, geo-location of the HOAs the time period and any variations in time periods such as a Saturday only or a Saturday and Sunday on a particular weekend. The price may be included and further, possible discounts. It will be understood that the system 10 operates to provide discounts as requested by the businesses for any of the market spaces available through the marketplace system 10. These may be spaces that are available during community events, such as parties, community BBQ's, community yard/garage sales, and the like.

In other embodiments, product promotion pop-ups may be leased through the system 10 at public golf courses and the like, as shown in FIG. 11. The server 10 may send for display on the user computing device 12 a map with all golf courses with pop-up spaces available for lease and the user may select one and is directed to the user interface shown in FIG. 11. The location of the pop-up space may be depicted on a map of the golf course, along with other information, such as, but not limited to the geo-location, the time period for the lease and the price. In some embodiments of the golf course lease, the pop-up space available may include an image of the pop-up and what the surrounding grounds look like with an image and/or video as depicted in FIG. 12.

Embodiments operate to allow for micro sales periods for market efficiencies. This marketplace system 10 provides a means for market spaces to be leased for special time periods, such as holidays (see FIG. 8) that allow businesses to capitalize on market fluctuations. These time periods may be holidays (FIG. 8), an event such as a concert, a sporting event (FIG. 4-5) and the like.

As the system 10 operates, the server stores information regarding market spaces that are leased through the system 10. It includes the type of market spaces, the lease price for the spaces, the time periods, the geo-locations and the so forth. This historical data may be referred to by the system 10 and utilized in a processing algorithms to establish a value for various marketplaces that are provided for lease through the marketplace system 10. In embodiments, the value established is automatically generated by the system accounting for market conditions and historical data to account for fluctuations in the market around certain time periods and the like. In at least this way, the server 14 is programmed with artificial intelligent software to predict values for market spaces available for lease. In other embodiments, the system 10 may use the historical data to provide the user with the value of comparable market spaces that have been leased through the system in the particular area and particular type of market space, thereby allowing the user to determine if the lease price associated with an available market space is reasonable.

Embodiments may be available on or through the internet, such as through domain names reserved and owned by Applicant that include marketspace-marketplace.com, marketspacemarketplace.com, shelfspacevalue.com, shelfvalue-.com, promotion-spot.com, brandspotmarketing.com, table-forrent.com and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of leasing market space, the method comprising:

sending a signal from a user computing device to a server for processing that the user computing device has accessed a system and is searching for available market spaces to lease at a system determined time period;

displaying, on the user computing device, market space information including available market spaces to lease and a map showing locations of the available market spaces to lease within businesses;

determining a value of leased market spaces based on processing historical data stored in a memory of the server related to a particular area and particular type of the leased market spaces;

leasing a selected available market space of the available market spaces in response to receiving user input requesting leasing of the selected available market space; and sending visual verification of the selected available leased market space to the user computing device to verify product placement in the selected available leased market space during the lease period.

2. The method of claim 1, wherein the market space information further comprises a geo-location of the available market spaces.

3. The method of claim 1, wherein the market space information further comprises one of the available market spaces comprising a location within a store.

4. The method of claim 1, wherein the market space information further comprises a time period for leasing the available market spaces.

5. The method of claim 1, further comprising displaying on the user computing device images of the available market spaces, in response to receiving an input from the user computing device to view the images of the available market spaces.

6. The method of claim 1, wherein determining a value of leased market spaces based on processing historical data stored in the memory of the server related to a particular area and particular type of the leased market spaces further comprises operating artificial intelligent software to operate an algorithm to account for fluctuations in a market around certain time periods.

* * * * *